United States Patent [19]

Matsuki et al.

[11] Patent Number: 5,478,115
[45] Date of Patent: Dec. 26, 1995

[54] SAFETY MECHANISM FOR MECHANICAL TRIGGER DEVICE OF GAS GENERATOR

[75] Inventors: Masuo Matsuki; Kuniaki Takano, both of Kanagawa, Japan

[73] Assignee: NSK Ltd., Tokyo, Japan

[21] Appl. No.: 291,027

[22] Filed: Aug. 16, 1994

[30] Foreign Application Priority Data

Aug. 25, 1993 [JP] Japan .................................. 5-050390

[51] Int. Cl.[6] .................................................. B60R 22/46
[52] U.S. Cl. .................................. 280/806; 280/734
[58] Field of Search ........................... 280/806, 805; 297/480, 470, 471, 474; 242/374, 379.1

[56] References Cited

U.S. PATENT DOCUMENTS

| | | | |
|---|---|---|---|
| 4,955,638 | 9/1990 | Kinoshita et al. | 280/806 |
| 5,092,628 | 3/1992 | Tumura | 280/734 |
| 5,129,680 | 7/1992 | Mori | 280/806 |
| 5,143,403 | 9/1992 | Fohl | 280/806 |
| 5,149,134 | 9/1992 | Fohl | 280/806 |
| 5,383,388 | 1/1995 | Ono | 280/734 |

FOREIGN PATENT DOCUMENTS

| | | | |
|---|---|---|---|
| 2182555 | 7/1990 | Japan . | |
| 396456 | 4/1991 | Japan . | |
| 4104752 | 9/1992 | Japan . | |
| 4104054 | 9/1992 | Japan . | |
| 5-85304 | 7/1993 | Japan | 280/806 |
| 2272148 | 5/1994 | United Kingdom | 280/806 |
| 2274384 | 7/1994 | United Kingdom | 280/806 |
| 2276309 | 9/1994 | United Kingdom | 280/806 |

*Primary Examiner*—Karin L. Tyson
*Attorney, Agent, or Firm*—Evenson, McKeown, Edwards & Lenahan

[57] ABSTRACT

A safety mechanism is provided for a mechanical trigger device of a gas generator. The mechanical trigger device has an inertia body, which is displaceable upon application of a deceleration of at least a predetermined value, and a mechanical trigger for actuating the gas generator in response to a displacement of the inertia body. The safety mechanism comprises a device for selectively setting the trigger in a first state where the trigger is operative or in a second state where the trigger is prevented from operation. This setting device has a member displaceable between a first position where the trigger is set in the first state and a second position where the trigger is set in the second state. The safety mechanism also comprises a cover member for being mounted to cover the setting device. This cover member has mount-preventing member for interfering with the displaceable member located in the second position so that mounting of the cover member is prevented.

5 Claims, 5 Drawing Sheets

SAFETY MECHANISM FOR MECHANICAL TRIGGER DEVICE OF GAS GENERATOR

BACKGROUND OF THE INVENTION a) Field of the Invention

This invention relates to a safety mechanism for a mechanical trigger device of a gas generator, which generates working gas to actuate a webbing pretensioner for taking up a slack of a webbing so that an occupant can be effectively restrained in a seat upon collision of a vehicle or an air bag system for protecting an occupant by an air bag from an impact upon collision of a vehicle.

To more effectively protect an occupant in the event of an emergency such as a vehicular collision, occupant protecting systems such as webbing pretensioners or air bag systems have found wide-spread utility in recent years.

A webbing pretensioner is provided with a cable wound on a take-up spindle of a webbing retractor. This cable is connected to a piston which is slidably fitted in a cylinder. By displacing the piston within the cylinder under the thrust of an expanding pressure of explosively-expanding working gas, the cable is pulled to rotate the take-up spindle so that any slack of a webbing is taken up to restrain an occupant in a seat.

An air bag system, on the other hand, has an air bag folded and stored, for example, in a center pad of a steering wheel. By causing the air bag to instantaneously inflate with explosively expanding working gas upon collision of a vehicle, an occupant's body which is inertially moving is supported with a reduced deceleration on the occupant's body so that the occupant can be protected from an impact of the collision.

There is also a trigger device for a gas generator which produces working gas to actuate these webbing pretensioner and air bag system in the event of a vehicular collision. Examples of such a trigger device include a mechanical trigger device making use of an inertia body which is displaced by a sudden deceleration occurred upon collision of a vehicle.

This trigger device has the structure that utilizes motion of the inertia body which is displaced by a collision. A firing pin which is normally held in an inoperative position is driven out toward a detonator, whereby the detonator is fired to ignite a propelling charge. The propelling charge is hence caused to burn, thereby obtaining explosively expanding actuating gas.

In a webbing pretensioner or air bag system equipped with a gas generator having such a mechanical trigger device, it is necessary to avoid any accidental actuation of such a webbing pretensioner or air bag system prior to its assembly on a vehicle and after assembly on the vehicle, to ensure its fail-free actuation in the event of an emergency such as a collision.

As will be described below, a variety of safety devices have therefore been proposed for mechanical trigger devices of gas generators so that the mechanical trigger devices are prevented from accidental actuation before their assembly in vehicles but are ensured to actuate subsequent to their assembly in the vehicles.

For example, Japanese Patent Application Laid-Open (Kokai) No. HEI 2-182555 laid open on Jul. 17, 1990 discloses a collision detecting device for a vehicle, which detects action of a deceleration of at least a predetermined value on the vehicle to actuate a webbing pretensioner so that upon collision of the vehicle, a webbing is tensioned to increase restraining force for an occupant. The collision detecting device is provided with setting means having a turnable member for selectively bringing the collision detecting device into an operative state or an inoperative state depending on the turned position and also with braking means having a pressing member arranged in opposition to a surface of the webbing. The turnable member and the pressing member are interlocked with each other by cam means, and the pressing member is pressed against or separated from the webbing depending on the turning of the turnable member.

According to this collision detecting device for the vehicle, the pressing member which is interlocked with the turnable member applies a brake to the webbing when the collision detecting device is selectively set in the inoperative state. The webbing therefore remains unusable insofar as the collision detecting device is not set in the operative state. This makes it possible to confirm the non-released state of the safety mechanism.

Further, U.S. Pat. No. 5,129,680 issued Jul. 14, 1992 to Shinji Mori discloses a pretensioner sensor suited for use with a webbing retractor for winding an occupant-restraining webbing in layers on a take-up shaft and adapted to actuate a pretensioner so that upon sudden deceleration of a vehicle, the webbing can be applied tightly onto an occupant. The pretensioner sensor is provided with release means for selectively bringing the pretensioner sensor into an operation-prevented state or an operative state, means for biasing the releasing means in the direction that the pretensioner sensor is maintained in the operation-prevented state, and means for fastening the webbing retractor and a vehicle body together. The fastening means has a fastening path at a position where the fastening means interferes with the fastening means. By moving a predetermined distance on the fastening path, the fastening means interferes with the releasing means against biasing force of the biasing means so that the release means brings the pretentioner sensor into the operative state. As long as the fastening means does not interfere with the release means, the pretensioner sensor is maintained in the operation-prevented state by the biasing force of the biasing means.

Upon mounting the webbing retractor on the vehicle body, for example, by using a bolt, a lever as the releasing means is turned against the biasing force of the biasing means by a free end of the bolt so that the pretensioner sensor can be brought into the operative state.

In addition, U.S. Pat. No. 5,149,134 issued Sep. 22, 1992 to Artur Föhl discloses a safety mechanism for a pretensioner of a vehicle seatbelt system in which a webbing retractor and a pretensioner trigger device are integrally assembled as a seatbelt assembly having a mounting flange and an inertia member is displaceably arranged in a housing to sense a deceleration of a vehicle. This safety mechanism is equipped with a displaceable, blocking member, a control member and a two-arm lever. The displaceable, blocking member makes the pretensioner inoperative and until the seatbelt assembly is mounted on a vehicle body, is maintained in engagement with the inertia member to block displacement of the inertia member. The control member extends from an inner side to an outer side of the housing and is displaceably attached to a wall of the housing. The control member is movable between a first position where the blocking member engages the inertia member and a second position where said blocking member is disengaged from the inertia member. The two-arm lever is pivotally mounted on the housing for moving the control member, and has a first arm with a sensing lug on its free end adjacent the mounting flange and a second arm engaging the control member.

Owing to the construction described above, mounting of the seatbelt assembly on the vehicle body results in holding of the first arm of the lever between the seatbelt assembly and the vehicle body. The lever is then allowed to pivot about a bearing pin so that the second arm causes the control member to move to the second position where the blocking member is disengaged from the inertia member. As a consequence, the inertia member is rendered displaceable, thereby making the pretensioner operative.

The collision detecting device disclosed in Japanese Patent Application Laid-Open (Kokai) No. HEI 2-182555 has the turnable member for selectively bringing the collision detecting device into the operative state or the inoperative state, the pressing member for pressing the webbing and the cam means for interlocking the collision detecting device and the pressing member, and has an extremely complex structure. The collision detecting device according to Japanese Patent Application Laid-Open (Kokai) No. HEI 2-182555 therefore involves the problem that it requires a high manufacturing cost.

The pretensioner sensor disclosed in U.S. Pat. No. 5,129,680 is accompanied by the problem that the lever as the releasing means may not turn and the pretensioner sensor may hence remain in the operation-prevented state if upon mounting the webbing retractor on the vehicle body by a bolt, tightening of the bolt is not sufficient or a worker erroneously uses a shorter bolt.

In this pretensioner sensor, the lever as the releasing means is turned using the bolt by which the webbing retractor is fastened to the vehicle body, so that the lever is located at a position hidden behind the vehicle body. There is accordingly the problem that the worker cannot directly check by his eyes if the lever has been turned correctly.

The safety mechanism for the pretensioner of the vehicle seat belt system, which is disclosed in U.S. Pat. No. 5,149,134, requires additional parts such as the lever so that a higher manufacturing cost is needed. Moreover, there is the potential danger that the control member may not move correctly and the pretensioner may not be brought into the operative state if upon mounting the webbing retractor on the vehicle body, the worker hits the vehicle body with the webbing retractor or accidentally drops the webbing retractor onto the floor and the lever is hence deformed. Since the webbing retractor is fastened to the vehicle body by bolts with the lever interposed therebetween, there is the potential danger that the webbing retractor may become inoperative because tightening of the fastening bolts may be insufficient or the fastening bolts may gradually become looser if the flatness of the lever is not sufficient or its coating film is too thick.

SUMMARY OF THE INVENTION

With the above-described conventional problems in view, the present has as a primary object the provision of a safety device for a mechanical trigger device of a gas generator, which safety device has a simple structure, can be manufactured at reduced cost and permits fail-free checking of assembly of the mechanical trigger device in an operation-prevented state on a vehicle.

In one aspect of the present invention, there is thus provided a safety mechanism for a mechanical trigger device of a gas generator, said mechanical trigger device having an inertia body displaceable upon application of a deceleration of at least a predetermined value and a mechanical trigger for actuating said gas generator in response to a displacement of said inertia body, comprising:

means for selectively setting said trigger in a first state where said trigger is operative or in a second state where said trigger is prevented from operation, said setting means having a member displaceable between a first position where said trigger is set in said first state and a second position where said trigger is set in said second state; and a cover member for being mounted to cover said setting means, said cover member having mount-preventing means for interfering with said displaceable member located in said second position so that mounting of said cover member is prevented.

In another aspect of the present invention, there is also provided a safety mechanism for a trigger device suited for use in actuating a gas generator, comprising:

a displaceable member capable of assuming a first position when said trigger device is operative or a second position when said trigger device is held inoperative; and a cover member for being mounted to cover said displaceable member, said cover member having mount-preventing means for permitting mounting of said cover member when said displaceable member is located at said first position but interfering with said displaceable member to prevent mounting of said cover member when said displaceable member is located at said second position.

According to the construction of each of the above aspects, the mount-preventing means of the cover member interferes with the displaceable member to prevent mounting of the cover member when the displaceable member of the safety mechanism for the mechanical trigger of the gas generator is at the second position where the displaceable member prevents actuation of the mechanical trigger for the gas generator. It is therefore possible to easily find out mounting of the mechanical trigger device in the operation-prevented state on the vehicle.

DETAILED DESCRIPTION OF THE PRESENT INVENTION

Figure 1:
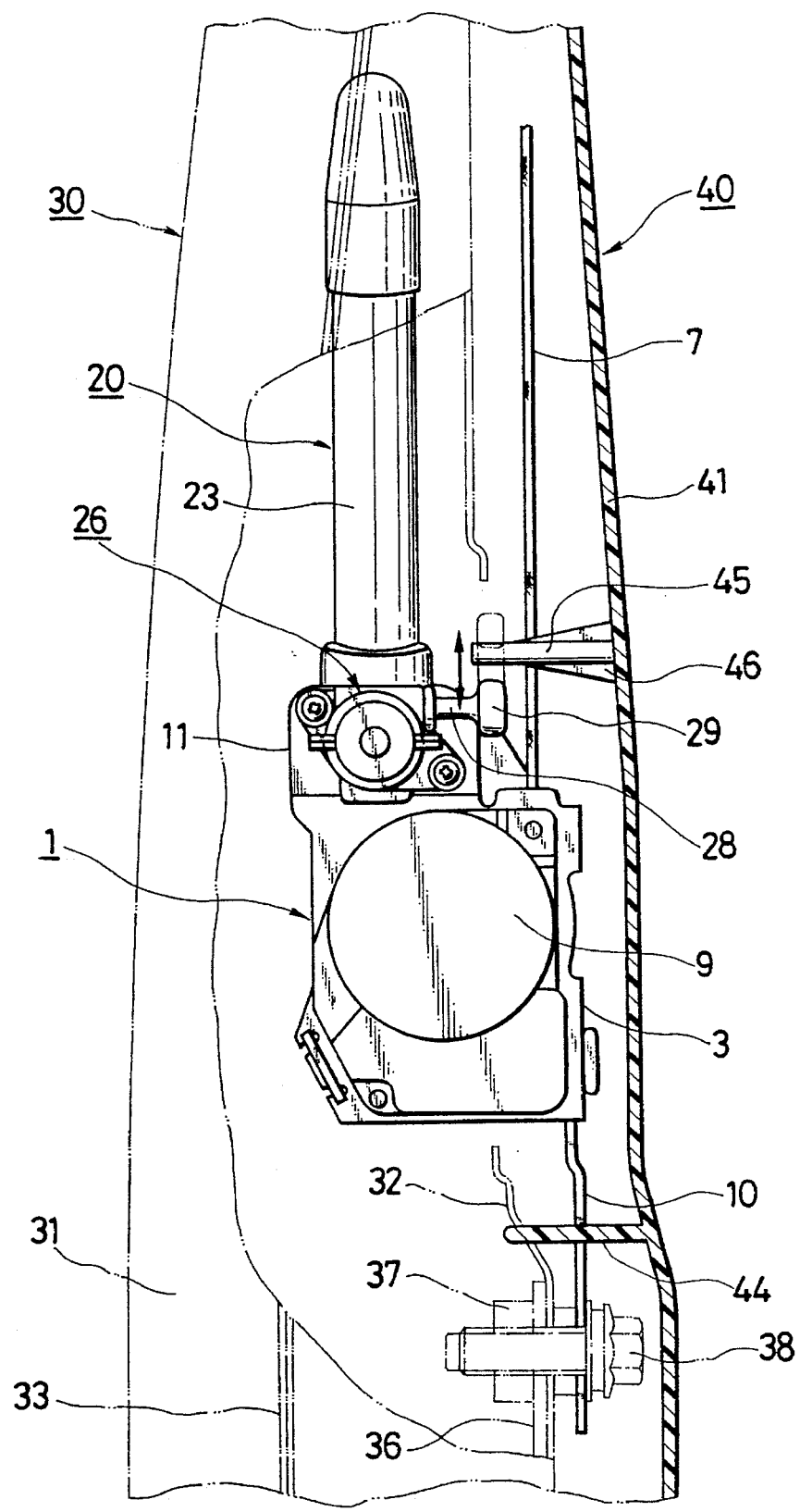
FIG. 1 is a front view showing a positional relationship of a webbing retractor, which is equipped with a pretensioner having a safety mechanism according to one embodiment of the present invention, and a center pillar trim.
Figure 2:
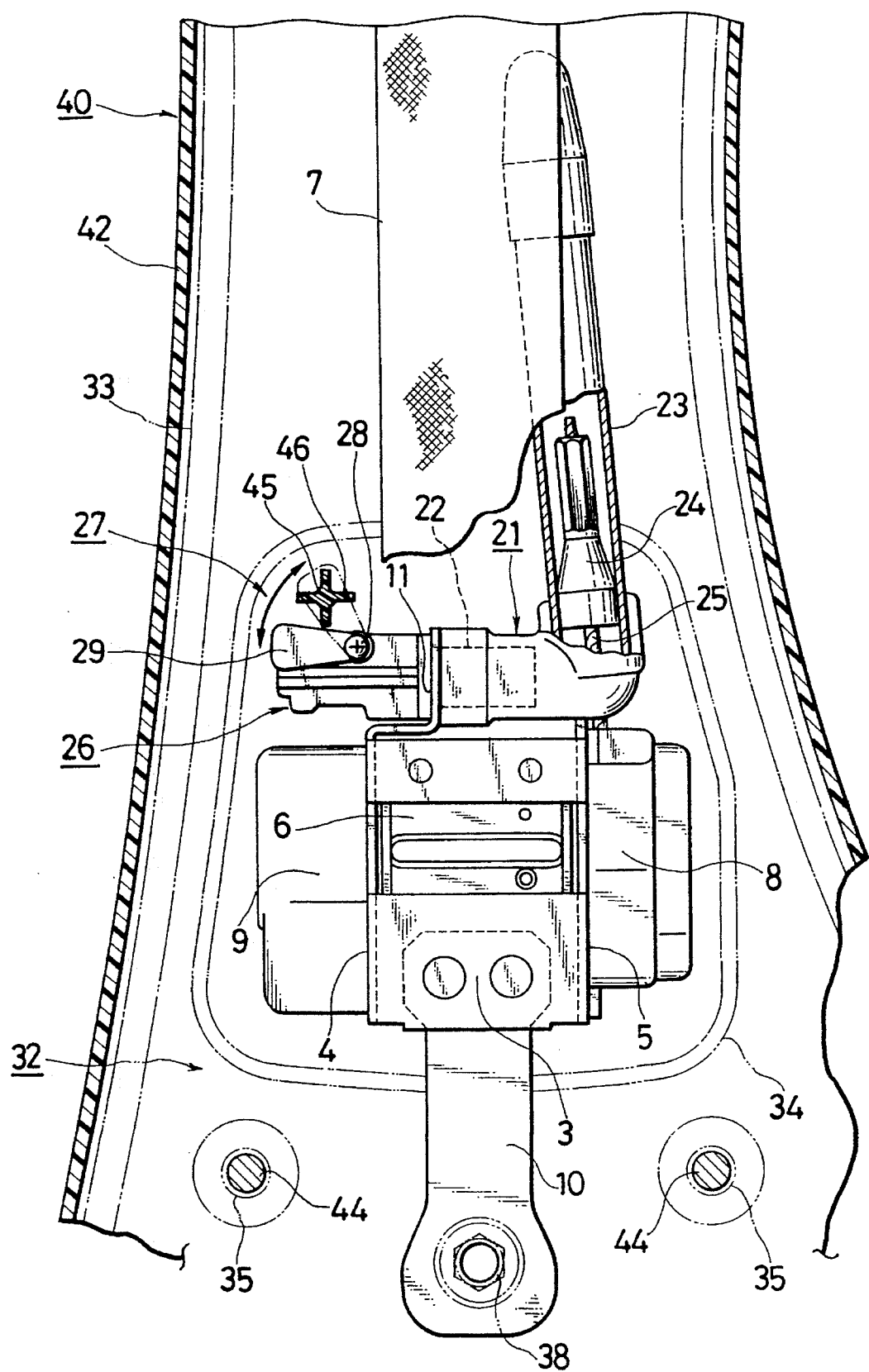
FIG. 2 is a side view showing the positional relationship of the webbing retractor, which is equipped with the pretensioner having the safety mechanism according to one embodiment of the present invention, and the center pillar trim as illustrated in FIG. 1.
Figure 3:
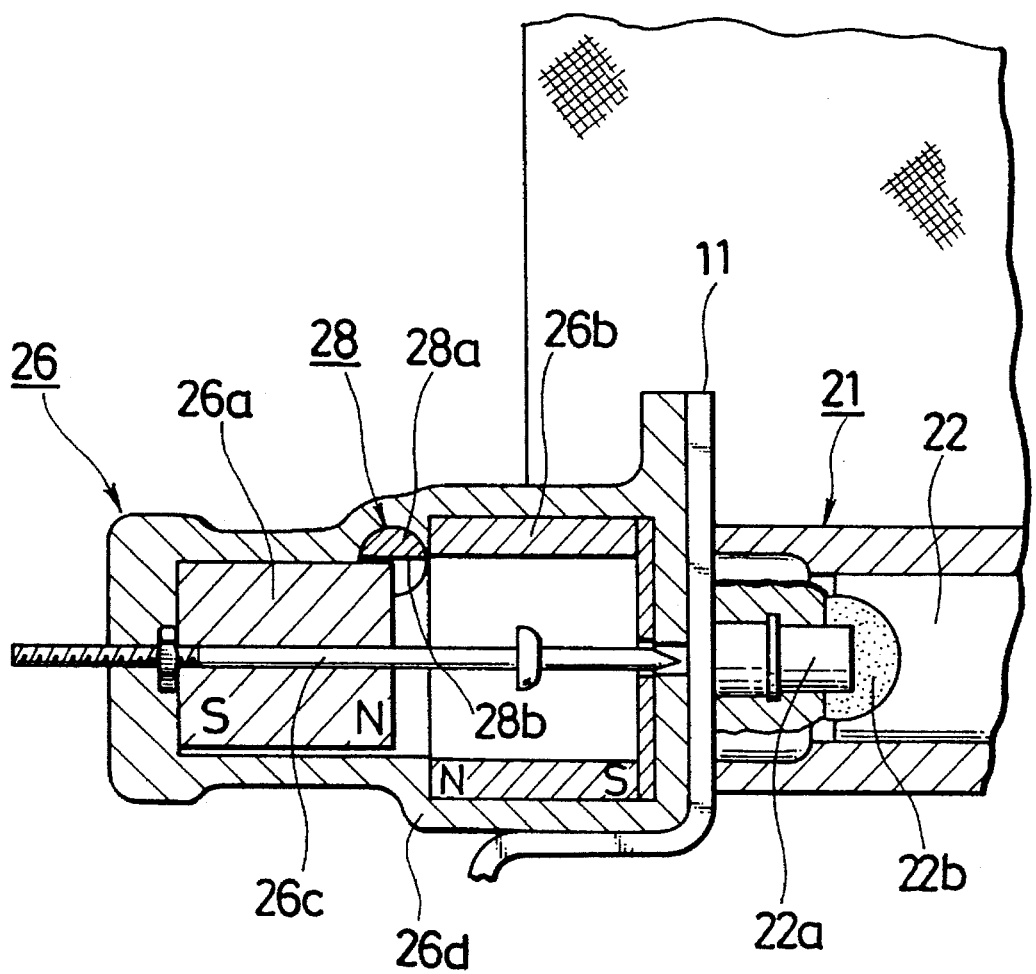
FIG. 3 is an enlarged fragmentary cross-sectional view of a trigger device shown in FIGS. 1 and 2.

Referring first to FIGS. 1, 2 and 3, a webbing retractor 1 with a pretensioner will be described. This webbing retractor 1 is to protect, for example, an occupant in a driver's seat or a front passenger's seat and is mounted on a center pillar 30. Its webbing 7 is guided by an unillustrated webbing guide secured on an upper part of the center pillar 30, and is detachably connected to a buckle device which is disposed near the waist of the occupant and is also free of illustration.

This webbing retractor 1 has a frame 3 formed of a steel plate, having a turned square U-shaped cross-section and equipped with a pair of mutually-opposing side walls 4,5, a take-up reel 6 rotatably supported at opposite ends thereof on the side walls 4,5 and adapted to take up the webbing thereon, a take-up spring unit 8 normally biasing the take-up reel 6 in a webbing-winding direction, and an emergency lock mechanism 9 for locking rotation of the take-up reel 6 to prevent any further extension of the webbing 7 when a sudden deceleration has occurred on an automotive vehicle on which the webbing retractor 1 is mounted.

A tongue-shaped fixing member 10 which has been riveted on a lower part of a rear wall of the frame 3 as viewed in FIGS. 1 and 2 is secured on the center pillar 30 by a bolt 38, whereby the webbing retractor 1 is fixed on a vehicle body.

Further, an upwardly-extending, plate-shaped bracket 11 is provided integrally with the side wall 4 so that the bracket 11 extends from an upper edge of the side wall as viewed in the drawings. In parallel with the side walls 4,5, an upper end portion of the bracket 11 extends upwardly as viewed in the drawings. On opposite sides of the flange 11, a housing 21 of a pretensioner 20 and a hammer pin trigger 26 are mounted so that the housing 21 and the hammer pin trigger 26 are located opposing each other. The housing 21 and the hammer pin trigger 26 are fastened together by bolts so that the flange 11 is held therebetween.

The housing 21 is made of a metal and has a cylindrical shape. A gas generator 22 is assembled in an end portion of the housing 21, said end portion being on a side of the flange 11, and a cylinder 23 extending upwardly as viewed in the drawings and preferably, made of aluminum is attached to an opposite end portion of the housing 21. Fixedly connected to a piston 24—which is slidably fitted within the cylinder 23 and preferably, made of aluminum—is a free end portion of a cable 25 wound on a take-up spindle (not shown) of the take-up reel 6.

The piston 24 is caused to move toward a free end of the cylinder 23 by an expanding pressure of explosively expanding working gas produced by the gas generator 22, whereby the cable 25 causes the take-up spindle to rotate and wind up the webbing 7 thereon. As a consequence, a slack of the webbing 7 is eliminated so that the occupant is restrained in the seat.

The hammer pin trigger 26 is equipped with an inertia body 26a, which is arranged in a cylindrical housing 26d (which can preferably be made of aluminum or a synthetic resin) so that the inertia body 26a is displaced when a deceleration of at least a predetermined value has acted thereon. Although the hammer pin trigger 26 is not an essential part of the present invention, a brief description is now made of the hammer pin trigger 26. When a deceleration of at least the predetermined value acts, the resulting inertia force of the inertia body (magnet) 26a exceeds a repulsive force between the inertia body 26a and a cylindrical magnet 26b so that the inertia body 26a is displaced rightwards as viewed in FIG. 3. By this displacement of the inertia body 26a, a hammer pin 26c strikes and fires a detonator 22a accommodated in the gas generator 22. A gas-generating chemical reagent 22b disposed in the gas generator 22 then explosively burns so that a great deal of gas of high temperature and pressure is fed into the cylinder 23.

The hammer pin trigger 26 is provided with setting means 27 which is in turn equipped with a mechanism for preventing accidental actuation of the hammer pin trigger 26 prior to assembly of the webbing retractor 1 in a vehicle. The setting means 27 has a shaft 28 and as a displaceable member, a lock lever 29. The shaft 28 is arranged extending through a wall of the cylindrical housing 26d. The lock lever 29 is secured by a screw on a free end portion of the shaft 28, said free end portion being located outside the cylindrical housing 26d, in such a way that the lock lever 29 extends in a direction perpendicular to an axis of the shaft 28. The lock lever 29 is formed broader on a side of a free end thereof than on a side of a basal end thereof so that the lock lever 29 is assured to function even if the webbing retractor 1 and/or a below-described center pillar trim 40 is mounted at positions somewhat shifted from their corresponding specified positions. On a portion of the shaft 28, said portion being located inside the cylindrical housing 26d, there is formed a lock portion 28a having a substantially semicircular cross-sectional shape as depicted in FIG. 3. When the lock lever 29 is turned to a position at which the lock lever 29 extends upwardly and leftwardly as indicated by phantom in FIG. 2, a flat face 28b which extends diametrically across the lock portion 28a is brought into engagement with the inertia body 26a at an end face thereof located on a side of the detonator 22a so that the inertia body 26a can no longer be displaced toward the detonator 22a. As a consequence, the hammer pin trigger 26 is maintained in an operation-prevented state.

When the lock lever 29 is conversely turned to a horizontally extending position as shown by solid lines in FIG. 2, the engagement between the shaft 28 and the inertia body 26a is released as shown in FIG. 3 so that the inertia body 26a is rendered displaceable. The hammer pin trigger 26 has therefore been brought into an operative state.

A description will next be made of the center pillar 30 on which the webbing retractor 1 with the pretensioner 20 constructed as described above is mounted.

Referring first to FIG. 1, this center pillar 30 has been formed as a hollow body, for example, by bringing an outer panel 31 and an inner panel 32, each of which was formed in a substantially square U-shaped cross-section by pressing a steel plate, into close contact with each other at their flanges 33 and then spot-welding the flanges 33. As is best shown in FIG. 2, the inner panel 32 defines an opening 34 for receiving therein the webbing retractor 1 with the pretensioner 20 attached thereto and also plural through-holes 35 in which resin clips are to be fitted for mounting the below-described center pillar trim 40 as a cover member.

Below the opening 34, a reinforcement panel 36 is arranged in close contact with the inner panel 32 as shown in FIG. 1. On an inner side of the inner panel 32, a weld nut 37 is secured surrounding a through-hole formed through both the reinforcement panel 36 and the inner panel 32.

The center pillar trim 40 as the cover member covering the center pillar 30 will next be described.

As is illustrated in FIGS. 1 and 2, this center pillar trim 40 has been formed in a substantially C-shaped cross-section by injection molding a resin material, for example, polypropylene or the like. The center pillar trim 40 is arranged extending in a vertical direction along the length of the center pillar 30, and has a substantially flat portion 41 extending along the inner panel 32 and flange portions 42 provided in parallel with each other and extending at a right angle from opposite edges of the flat portion 41, respectively, so that the flange portions 42 cover the corresponding flange portions 33 of the inner panel 32.

On an outboard side of the flat portion 41, plural resin clips 44 are arranged extending toward the inner panel 32 to secure the center pillar trim 40 on the inner panel 32 of the center pillar 30. These resin clips 44 are detachably fitted in the corresponding through-holes 35 formed in the inner pillar 32 so that the center pillar trim 40 is fixed on the center pillar 30.

Figure 4:
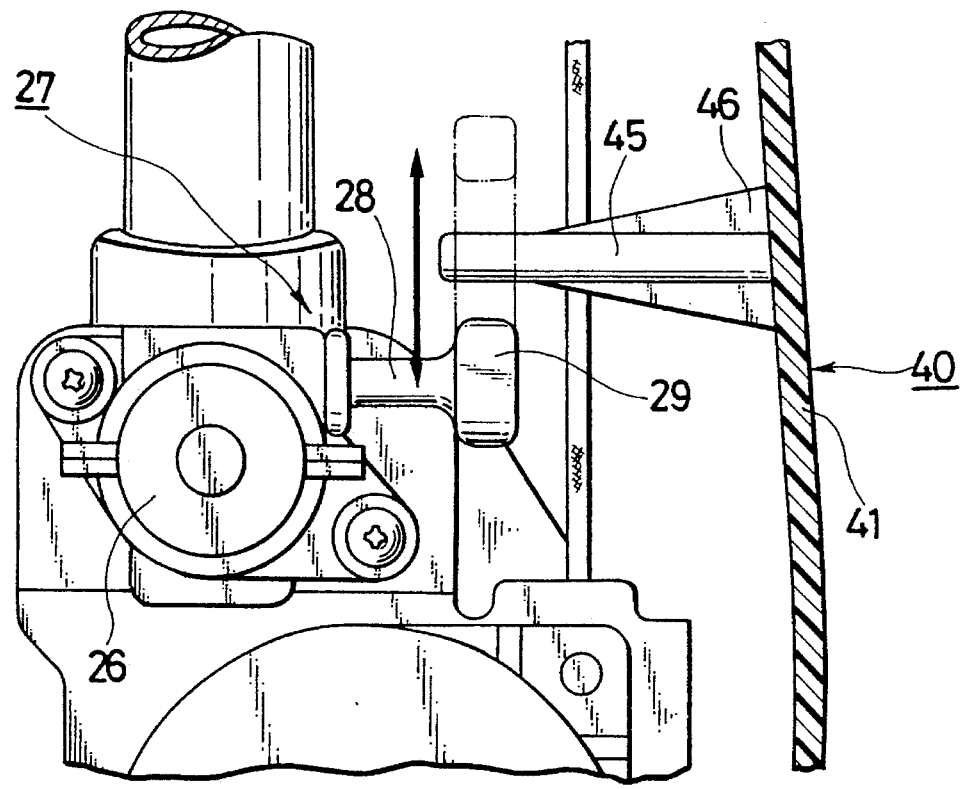
FIG. 4 is an enlarged fragmentary front view of the positional relationship of FIG. 1.
Figure 5:
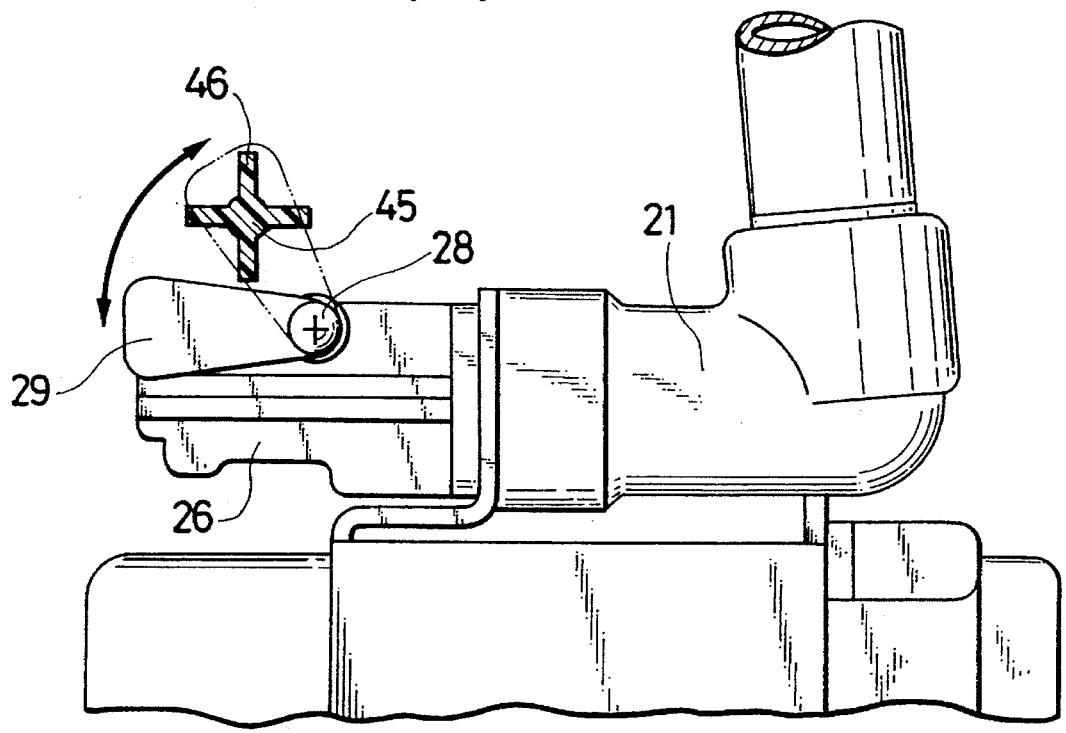
FIG. 5 is an enlarged fragmentary side view of the positional relationship of FIG. 2.

As mount-preventing means, a pin 45 is also arranged extending from the outboard side of the center pillar trim 40. This pin 45 has a rod-like structure reinforced by reinforcing ribs 46 so that the pin 45 will not bent readily. The reinforcing ribs 46 may be provided, for example, as if its side wall is subjected to padding. As depicted in FIGS. 4 and 5, the pin 45 and reinforcing ribs 46 are determined in position and shape in such a way that upon mounting the center pillar trim 40 on the center pillar 30, the pin 45 is brought into contact with the above-described lock lever 29 when the lock lever 29 has been turned to extend upwardly and leftwardly (as viewed in FIG. 5) but does not contact the lock lever 29 when the lock lever 29 has been set in the horizontally-extending position.

A description will next be made of assembly of the webbing retractor 1 with the pretensioner 20 attached thereto and the center pillar trim 40, said pretensioner 20 and center pillar trim 40 having been constructed as described above, on the center pillar 30.

First of all, to fix the webbing retractor 1 on the center pillar 30, a main body of the webbing retractor 1 is inserted into the center pillar 30 through the opening 34 of the inner panel 32 and its tongue-shaped fixing member 10 is temporarily secured on the inner panel 32 by the bolt 38. After positioning the webbing retractor 1 in such a way that the webbing 7 extends upwardly in the vertical direction, the bolt 38 is tightened to fix the webbing retractor 1. Upon completion of this fixing, the worker turns the lock lever 29 of the setting means 29 so that the lock lever 29 extends horizontally to bring the hammer pin trigger 26 into an operative state (see FIG. 3).

Next, the center pillar trim 40 is fixed by fitting the plural resin clips 44, which are arranged on the outboard side of the center pillar trim 40, in the plural through-holes 35 formed in the inner panel 32. As a corollary to this, the center pillar trim 40 is prevented from being mounted at any position shifted from a correct position relative to the center pillar 30.

Figure 6:
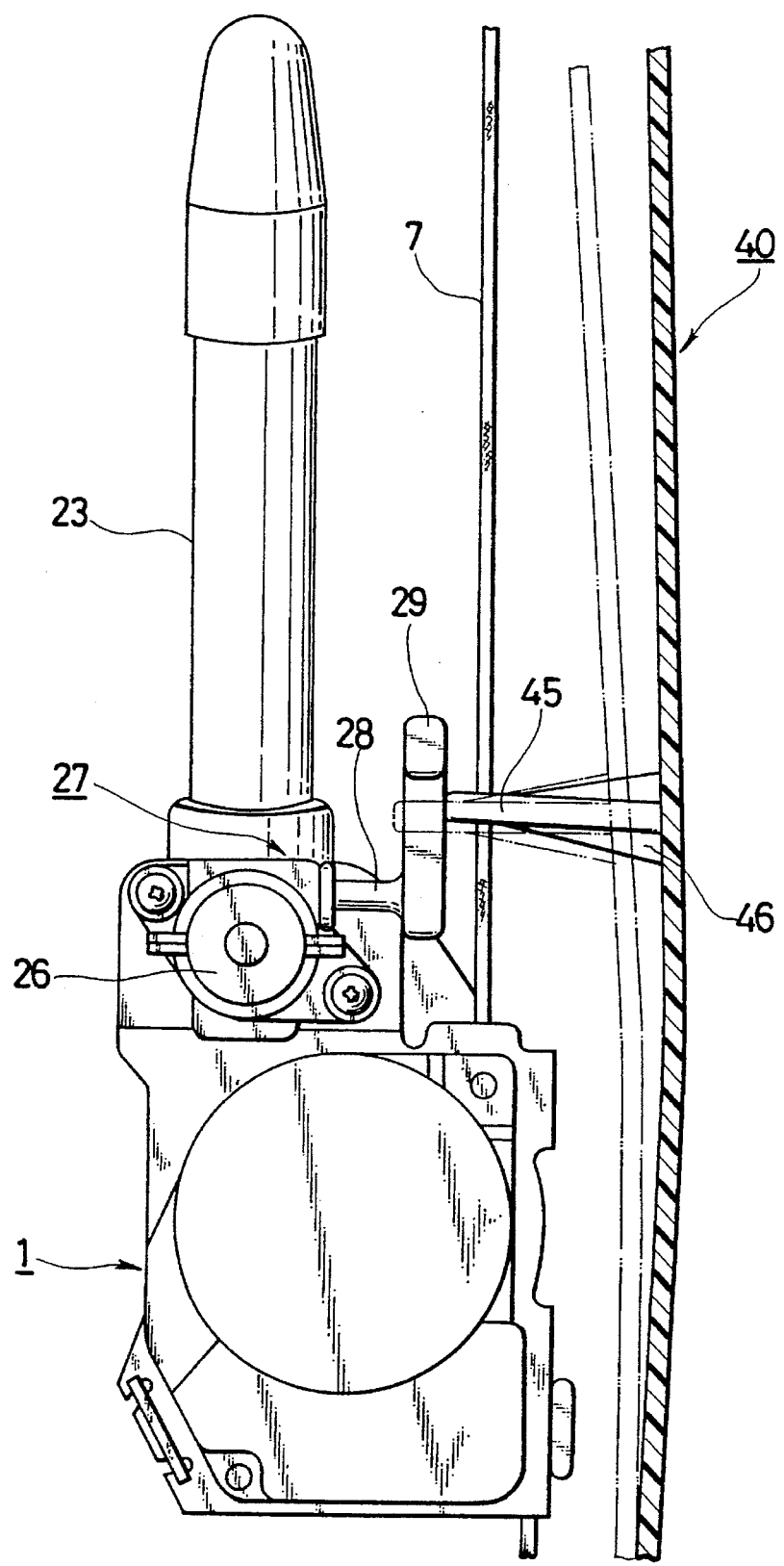
FIG. 6 is a schematic illustration showing mounting of a center pillar trim when the mechanical trigger device according to the present invention for the gas generator is in an operation-prevented state.

If the lock lever 29 has been turned in the upwardly and leftwardly extending position to set the hammer pin trigger 26 in the operation-prevented state upon attachment of the center pillar trim 40 to the center pillar 30 as described above, the pin 45 extending from the inboard side of the center pillar trim 40 is brought into contact with the lock lever as illustrated in FIG. 6 so that the center pillar trim 40 cannot be attached to the center pillar 30.

If the worker who is assigned to mount the webbing retractor 1 on the center pillar 30 should forget to turn the lock lever 29 to the horizontal position and hence to bring the hammer pin trigger 26 into an operative state, he cannot attach the center pillar trim 40 to the center pillar 30. Here, he can surely remember that the hammer pin trigger 26 has not been set in the operative state.

Accordingly, the worker turns the lock lever 29 into the horizontal position and then assembles the center pillar trim 40, whereby the assembly work of the center pillar trim 40 has been completed.

As has been described above, no modification has been added to the webbing retractor 1 with the pretensioner 20 attached thereto except that the lock lever 29 attached to the setting means 27 for the prevention of accidental actuation is formed broader on the side of the free end thereof than on the side of the basal end thereof. It is however to be note that the broader construction of the free end portion of the lock lever 29 is not essential. Further, the center pillar trim 40 has an extremely simple construction without any modification thereto except that the pin 45 has been injection-molded integrally on the outboard side thereof.

Despite such a simple construction, the center pillar trim 40 cannot be attached to the center pillar 30 when the lock lever 29 has been turned into the horizontally extending position to set the hammer pin trigger 26 in the inoperative state. It is therefore impossible to complete the assembly work as long as the pretensioner 20 is set in the inoperative state. Accordingly, the webbing retractor 1 equipped with the pretensioner 20 can be prevented from accidental actuation prior to its assembly in a vehicle but can be assured to operate without failure subsequent to its assembly in the vehicle.

In the embodiment described above, the center pillar trim is used as a cover member and the center pillar trim is provided with the pin as mount-preventing means. It is however unnecessary to limit the present invention to such a construction. For example, it is possible to adopt the construction that the mount-preventing means is arranged on a cover which closes the opening of the center pillar to prevent air leakage and dust intrusion.

The lock lever 29 is employed as a displaceable member in the above-described embodiment. The displaceable member in the present invention is however not necessarily limited to such a lock lever insofar as its position changes upon selectively setting the mechanical trigger device in the operative state or the operation-prevented state. For example, the displaceable member may be a member of a link mechanism or the like for operating the lock lever.

As has been described above, according to the safety mechanism according to the present invention for a mechanical trigger device of a gas generator, the setting means for selectively setting the trigger device in an operative state or an inoperative state has the displaceable member which is displaced between a first position where the trigger device is set in the operative state and a second position where the trigger device is set in the inoperative state. Further, the cover member mounted to cover at least the above setting means has the mount-preventing means which interferes with the displaceable member set in the second position. While the mechanical trigger device for the gas generator is set in the operation-prevented state, the mount-preventing means arranged on the cover member therefore interferes with the displaceable member set in the second position so that the setting of the trigger device in the operation-prevented state can be found without failure. Without the need for adopting such a complex construction as in the conventional art, the present invention has made it possible to avoid completion of assembly work of a mechanical trigger device for a gas generator in a vehicle with the trigger device being set in an operation-prevented state.

Further, formation of the cover member by injection molding of a resin material makes it possible to simultaneously form the mount-preventing means which is supposed to be arranged on the cover member. The safety mechanism can therefore be produced easily at extremely low manufacturing cost.

What is claimed is:

1. A safety mechanism for a mechanical trigger device of a gas generator, said mechanical trigger device having an inertia body displaceable upon application of a deceleration of at least a predetermined value and a mechanical trigger for actuating said gas generator in response to a displacement of said inertia body, comprising:

means for selectively setting said trigger in a first state where said trigger is operative or in a second state where said trigger is prevented from operation, said setting means having a lock lever turnable between a first position where said trigger is set in said second state, said lock lever being integral with a shaft, which is supported on said trigger device, and extending in a direction perpendicular to an axis of said shaft; and a cover member for being mounted to cover said setting means, said cover member having mount-preventing means for interfering with said lock lever located in said second position so that mounting of said cover member is prevented, wherein said axis of said shaft extends in a direction in which said cover member is to be mounted.

2. A safety mechanism according to claim 1, wherein said lock lever is lock lever formed broader on a side of a free end thereof located apart from said shaft than on a side of a basal end thereof located close to said shaft.

3. A safety mechanism for a mechanical trigger device of a gas generator, said mechanical trigger device having an inertia body displaceable upon application of a deceleration of at least a predetermined value and a mechanical trigger for actuating said gas generator in response to a displacement of said inertia body, comprising:

means for selectively setting said trigger in a first state where said trigger is operative or in a second state where said trigger is prevented from operation, said setting means having a member displaceable between a first position where said trigger is set in said first state and a second position where said trigger is set in said second state; and a cover member for being mounted to cover said setting means, said cover member having mount-preventing means for interfering with said displaceable member located in said second position so that mounting of said cover member is prevented, wherein said cover member is a pillar trim for covering a center pillar of a vehicle.

4. A safety mechanism for a mechanical trigger device of a gas generator, said mechanical trigger device having an inertia body displaceable upon application of a deceleration of at least a predetermined value and a mechanical trigger for actuating said gas generator in response to a displacement of said inertia body, comprising:

means for selectively setting said trigger in a first state where said trigger is operative or in a second state where said trigger is prevented from operation, said setting means having a member displaceable between a first position where said trigger is set in said first state and a second position where said trigger is set in said second state; and a cover member for being mounted to cover said setting means, said cover member having mount-preventing means for interfering with said displaceable member located in said second position so that mounting of said cover member is prevented, wherein said mount-preventing means is a projected portion formed on said cover member and extending toward a side of said displaceable member.

5. A safety mechanism for a trigger device suited for use in actuating a gas generator, comprising:

a lever member turnable to assume a first position when said trigger device is operative or a second position when said trigger device is held inoperative, said lever member being integral with a shaft, which is supported on said trigger device, and extending in a direction perpendicular to an axis of said shaft; and a cover member for being mounted to cover said lever member, said cover member having mount-preventing means for permitting mounting of said cover member when said lever member is located at said first position but interfering with said lever member to prevent mounting of said cover member when said lever member is located at said second position, wherein said axis of said shaft extends in a mounted direction in which said cover member is to be mounted.

* * * * *